United States Patent [19]
Hoffman et al.

[11] Patent Number: 5,250,929
[45] Date of Patent: Oct. 5, 1993

[54] INTERACTIVE OVERLAY-DRIVEN COMPUTER DISPLAY SYSTEM

[75] Inventors: Clifford J. Hoffman, Dayton; Keith A. Combs, Kettering, both of Ohio

[73] Assignee: Conference Communications, Inc., Dayton, Ohio

[21] Appl. No.: 734,155

[22] Filed: Jul. 29, 1991

[51] Int. Cl.5 .............................................. G09G 3/02
[52] U.S. Cl. .................................... 345/146; 178/18; 178/19; 345/157; 345/173
[58] Field of Search ............... 340/706, 712, 707, 709, 340/721; 178/18, 19

[56] References Cited

U.S. PATENT DOCUMENTS

| | | | |
|---|---|---|---|
| 4,451,895 | 5/1984 | Sliwkowski | 340/707 |
| 4,578,768 | 3/1986 | Racine | 178/18 |
| 4,677,258 | 6/1987 | Kawashima et al. | 178/18 |
| 5,070,323 | 4/1991 | Hoffman | 340/706 |

Primary Examiner—Ulysses Weldon
Assistant Examiner—Matthew Luu
Attorney, Agent, or Firm—J. T. Cavender

[57] ABSTRACT

An interactive overlay-driven computer display system wherein the selective activation of a software "switch" by the operator each time the digitizer stylus is contiguous to the overlay, causes a visual image of the overlay (which normally has selectable menu items printed thereon) to be automatically displayed on the monitor screen.

9 Claims, 3 Drawing Sheets

INTERACTIVE OVERLAY-DRIVEN COMPUTER DISPLAY SYSTEM

TECHNICAL FIELD

The present invention relates generally to computer display systems, and more particularly to an interactive overlay-driven computer display system which utilizes one or more overlays operable in conjunction with a digitizer tablet to input data to such computer system for computing, control and/or display purposes.

BACKGROUND OF THE INVENTION

A portion of the disclosure in this patent document contains material which is subject to copyright protection and to which a claim of copyright protection is made. The copyright owner has no objection to the facsimile reproduction by anyone of the patent document or the patent disclosure, as it appears in the United States Patent and Trademark Office patent files or records, but otherwise reserves all copyrights whatsoever.

Often in the use of a computer, it is desirable to input two-dimensional graphic data thereto for display, control and/or for processing purposes. A wide variety of such devices, commonly known as "digitizers", have been proposed and used for such purposes. Additionally, it is well known that printed overlays, or menus, placed on a digitizer tablet provide a fast and convenient method and means for permitting operator selection therefrom of drawing tools, fonts, and other computer executable functions printed thereon. Additionally, overlays placed on a digitizer tablet provide an advantage over conventional means of "point-and-click" monitor selection of menu items in that a larger number of simultaneously viewable items can be presented on a digitizer tablet. Printed overlays also enable the computer monitor work area to be devoted entirely to the display of working documents with little or no area thereof devoted to point-and-click menu items. A typical form of digitizer is shown in U.S. Pat. No. 3,684,828 to Maher. The digitizer normally includes a relatively flat surface for supporting one or more overlays in the form of a map, drawing or other source of graphic data, a stylus or other pointing device or cursor for designating individual points on the surface of each of such overlays, and means defining an X-Y, or rectangular, coordinate system for determining the rectangular coordinates for each individually designated point on each of such overlays. Well known interface circuitry is provided for converting the thus derived rectangular coordinate data into digital numbers arranged in an appropriate communication format for transmission to a computer for further processing. The Maher patent utilizes a piezoelectric substrate to detect the coordinates of the designated points by measuring the surface wave pulses propagating through the substrate surface. U.S. Pat. No. 3,692,936 to Moffitt discloses an acoustic digitizer, whereas, U.S. Pat. No. 4,177,354 discloses a digitizer employing a light responsive layer and a grid system which is used in combination with a light spot emitting stylus to generate digital coordinate signals. The digitizer of U.S. Pat. No. 4,255,617 to Caru et al employs a cursor with a capacitive pickup in combination with a platen comprising a flat surface within which are embedded two orthogonal grids, each consisting of uniformly spaced individual conductors. U.S. Pat. No. 4,318,096 to Thornburg et al discloses a rectangular coordinate tablet which is used in combination with an electrically conductive pen and an analog-to-digital converter to provide rectangular coordinate data to a computer. The tablet employs a piezoelectric audio pickup which produces a succession of pulses when the stylus is drawn across a textured surface such as a sheet of paper. Such orthogonally arranged sensors enable the direction of motion on a surface to be determined and "digitized" in each access by a bidirectional pulse counter.

In each of the systems referred to above, it is essential that the physical orientation of the overlay relative to the digitizer tablet surface, together with the particular scale and position of the overlay on the tablet surface, must be such that the position of the stylus on the overlay corresponds to the point on the tablet that will generate the correct coordinate signals for addressing the correct file stored in the computer memory. Misalignment results in the system becoming inoperative for the intended purpose.

In U.S. Pat. No. 5,010,323 issued to C. J. Hoffman, the same inventor as that of the present application, and which disclosure is incorporated herein by reference, there is disclosed a system wherein the utilized overlay may be physically positioned on the surface of the digitizer tablet in any physical orientation with respect to the coordinate axes of the digitizer tablet surface and, additionally, the overlay may be of any desired size. In the system disclosed in said '323 Hoffman patent, the physical orientation of the overlay on the digitizer tablet surface is automatically "transformed" to coincide with the coordinate axes of the digitizer tablet surface. Additionally, the overlay is provided with appropriate scaling information for automatically normalizing the size and position of the overlay.

An historical disadvantage of selecting menu items from overlays by each of the foregoing systems, when compared with point-and-click menu selection from the monitor screen by means of a cursor-position generating stylus in the form of a mouse or pen, or a self contained cursor-position generating stylus (e.g. "tailless mouse"), or the like, is that it has been necessary in each of such prior art systems that the vision of the computer operator be shifted from the monitor screen to the surface of the tablet, and back again, each time an overlay menu item is selected. This constant back and forth shifting of the line of vision of the operator is reported to be a significant cause of operator fatigue. However, in accordance with applicant's invention, there is provided an interactive overlay-driven computer display system which obviates the need for any back and forth shifting of operator vision between the monitor screen and the surface of the tablet, as in prior systems. Greater use of peripheral vision is possible, with reduced need for the constant refocusing of the eyes of the operator. Implementation of the present invention enables digitizer tablets with an appropriately designed stylus to perform as well as a mouse (with or without a tail) in all aspects of technical performance and human factors of touch and feel.

SUMMARY OF THE INVENTION

In accordance with the present invention, there is provided an interactive overlay-driven computer display system wherein the selective activation of a software "switch" by the operator each time the digitizer stylus is contiguous to the overlay, causes a visual image of the overlay (which normally has selectable menu items printed thereon) to be automatically displayed on the monitor screen.

From the foregoing, it can be seen that it is a principal object of the present invention to provide a new and improved interactive overlay-driven computer display system.

It is another object of the present invention to provide a new and improved interactive overlay-driven computer display system which effectively obviates the necessity for operator vision to be shifted back and forth between the monitor screen and the overlay.

It is a further object of the present invention to provide a new and improved interactive overlay-driven computer display system which is capable of effectively displaying on the monitor screen thereof a visual image of the overlay containing selectable menu items each time the stylus is contiguous to the overlay.

It is still another object of the present invention to provide a new and improved interactive overlay-driven computer display system which is capable of effectively displaying on the monitor thereof a visual image of the overlay containing selectable menu items whenever the stylus is contiguous to the overlay, all in a simple and economical manner.

These and other objects of the present invention will become more apparent and better understood when taken in conjunction with the following description and the accompanying drawings, throughout which like characters indicate like parts and which drawings form a part of the present specification.

DESCRIPTION OF THE PREFERRED EMBODIMENT

Figure 1:
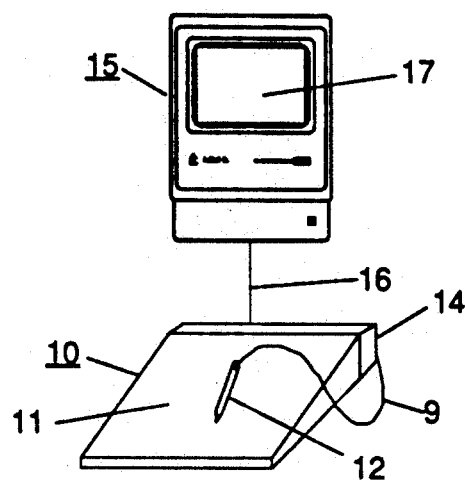
FIG. 1 is a block diagram, partly in perspective, of an interactive overlay-driven computer display system embodying the present invention.

With reference to FIG. 1 of the drawings, an interactive overlay-driven computer display system constructed in accordance with a preferred embodiment of the present invention comprises a graphics digitizer tablet 10, such as a NuMonic Corp's. tablet generally referred to as the "GridMaster", for example, which has a relatively flat activated surface 11 and a stylus 12 coupled to the digitizer tablet by means of a flexible cable 13. Use of a self contained stylus (or "puck") instead of the particular stylus disclosed may be preferred by some operators without departing from either the spirit or scope of the present invention. The digitizer tablet 10 senses the X and Y rectangular coordinate position of stylus 12 whenever it either touches or is contiguous to the tablet surface 11 and produces a data stream of X-Y coordinate signals corresponding to the physical position of point of stylus 12 relative to the X-Y coordinate axes of tablet surface 11, all as fully described and set forth in detail in the prior art previously referred to.

The X-Y coordinate signals outputted by tablet 10 are coupled to the input of a "soft keyboard" processor 14 by means of cable 9. Processor 14 effectively performs, in an electronic manner, a mathematical transformation of the overlay X-Y coordinate signals in a manner fully described in applicant's '323 patent previously referred to. The thus transformed X-Y coordinate signals are inputted to a computer 15 via cable 16. Computer 15 may be a personal computer, or the like, which contains an integrated monitor display 17 in the form or a cathode ray tube or liquid crystal device, or the like. In the preferred embodiment of the present invention, computer 15 is a "Macintosh" personal computer as manufactured by the Apple Computer, Inc. For some other types of computer systems, monitor display 17 may be a peripheral unit that is electrically coupled to computer 15. Additionally, processor 14 may optionally be an integral part of either tablet 10 or computer 15, provided the logic and memory capacities thereof are adequate, all as well known to those skilled in the computer art. The X-Y coordinate signals are inputted to computer 15 in real-time where they are converted to graphic information or, alternatively, are used for functional control of computer 15 or for control of an application program running on computer 15. This latter use for computer control purposes is frequently referred-to as "menu picking" in which predetermined computer controls are selected from a menu printed on an overlay, rather than being displayed on the viewing screen of the computer.

Figure 2:
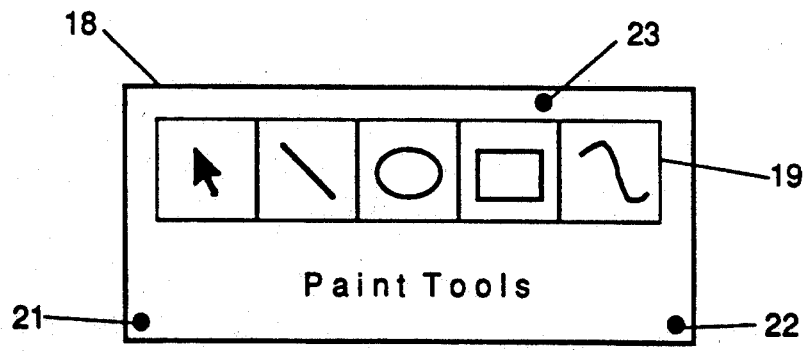
FIGS. 2 and 3 are plan views of illustrative overlays, each having operator-selectable menu items printed thereon, together with a corresponding triad or triangularly-positioned control points printed thereon, and which control points are sometimes referred to hereinafter as "delta" points.
Figure 3:
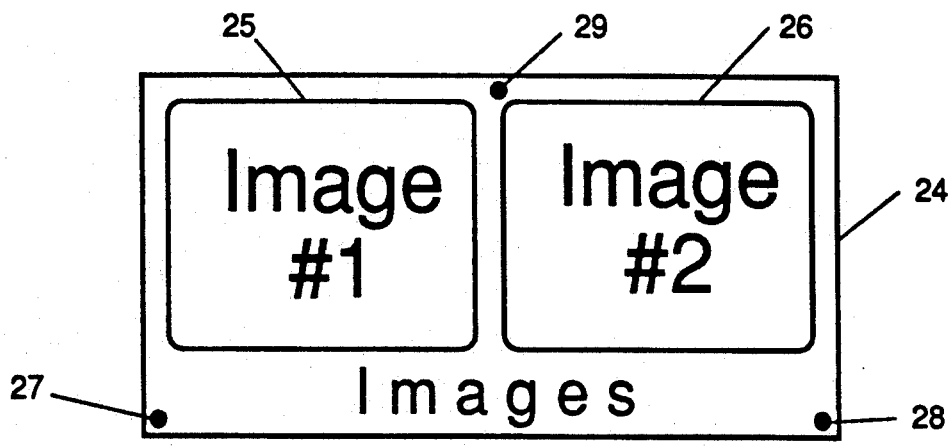

With reference to FIGS. 2 and 3 of the drawings, there are illustrated therein two representative and typical types of overlays 18 and 24, respectively, which are preferably constructed either of paper, plastic, cardboard or other suitable inert material depending, of course, upon the particular type of X-Y sensing technology selected for use in the tablet. Overlay 18 is shown as containing only a single artwork area 19 printed thereon which includes five different types of commonly used graphics tools, commonly referred to as "Paint Tools", printed thereon, whereas overlay 24 is shown as having two separate artwork areas 25 and 26 printed thereon, each comprising a single selectable computer function in the form of "Image #1" and "Image #2". While each of overlays 18 and 24 contains only a relatively few typical representations of various selectable keyboard, display and/or computer executable functions, it will readily be obvious to one skilled in the art that any collection of the many other available keyboard, display and/or computer executable functions may be printed thereon. For example, either of the two overlays may contain a plurality of selectable images or tablet points that, when selected by stylus 12, will generate input signals to computer 15 to permit the operator to further interface therewith to select executable control functions such as RESET, ADD, DELETE, QUIT, MENU BAR, and the like.

There are preferably printed on overlay 18 three delta points (or dots) 21, 22 and 23 and on overlay 24 three delta points (or dots) 27, 28 and 29 which are each physically positioned on the corresponding overlay in a predetermined position so as to collectively function as addressing control points for computer 15 in the same manner as described in detail in the said '323 Hoffman patent. Optionally, all of the delta points may be printed totally within or outside the corresponding artwork area of either or both of the overlays 18 and 24, or one or more points of each set of delta points may be located inside the respective artwork area and the remaining one or ones located outside thereof. The control points of each set, when connected by three imaginary lines, are each physically positioned at the vertex of a unique triangle. The relative position of each point with respect to the others of the same set, define the angles of a unique triangle whose included angles collectively represent or define a corresponding memory address or set of addresses within computer 15 wherein signals representative of the respective artwork are stored.

Figure 4A:
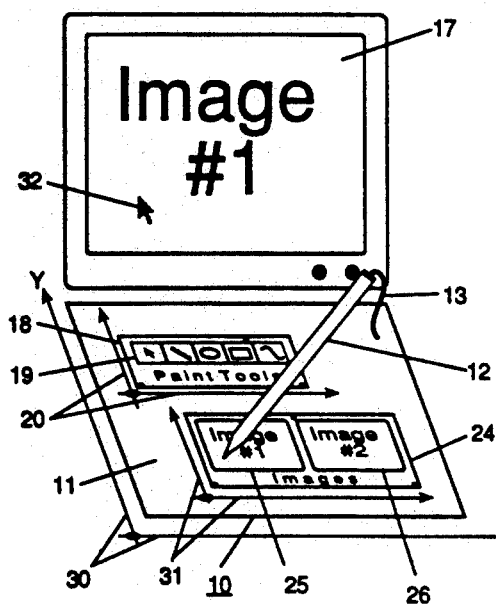
FIGS. 4(a) through 4(d) are a sequence of diagrammatic views depicting an illustrative implementation of the present invention; and, FIG. 5 is a logic flow diagram illustrating the utilization of the illustrative "Paint Tools" overlay and the illustrative "Images" overlay in connection with the interactive overlay-driven computer display system constructed in accordance with the teachings of the present invention.

In FIG. 4(a), overlays 18 and 24 are shown randomly positioned on the digitizer tablet surface 11 with their respective X-Y coordinate axes 20 and 31 each oriented at any angle with respect to the X-Y coordinate axes 30 of the digitizer tablet surface 11. Thereafter, signals individually representative of each set of delta points 21, 22 and 23 on overlay 18 and of each set of delta points 27, 28 and 29 on overlay 24 are randomly inputted into the computer by the sequential contact of each of the points in each selected set by the point of stylus 12. The computer software is designed to effectively translate the X-Y coordinates of each selected set of delta points obtained from the tablet to identify a specific overlay description file containing information descriptive of the overlay geometry and functions. After the overlay representative file is identified, the software effectively translates and scales each succeeding X-Y coordinate point coincident with the overlay on the tablet, to effectively match the coordinate system of the overlay as stored in the overlay representative file stored in computer memory. After the overlay representative file has been addressed or "selected", the operator is thereafter permitted to select any of the various computer functions represented thereon to be either displayed and/or executed by computer 15 in a selective manner.

For example, in FIG. 4(a) it is assumed that the operator has previously touched each of the three delta points on both of overlays 18 and 24 with stylus 12, thereby selecting each of the representative files or images thereof from the computer memory in the same manner as described in detail in said '323 Hoffman patent.

Figure 4B:
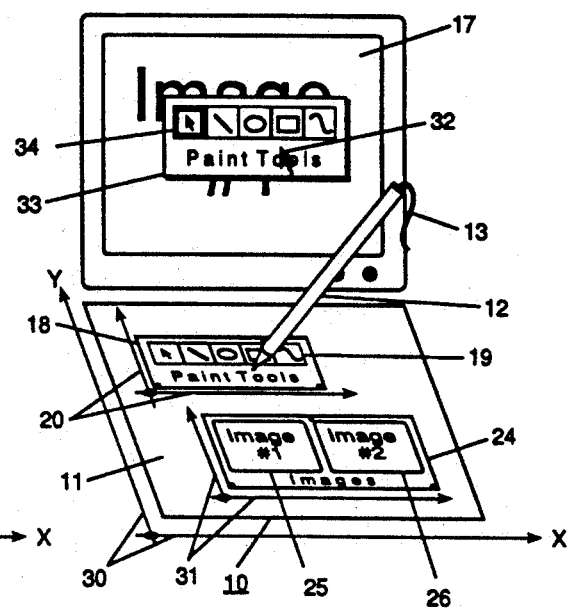
Figure 4C:
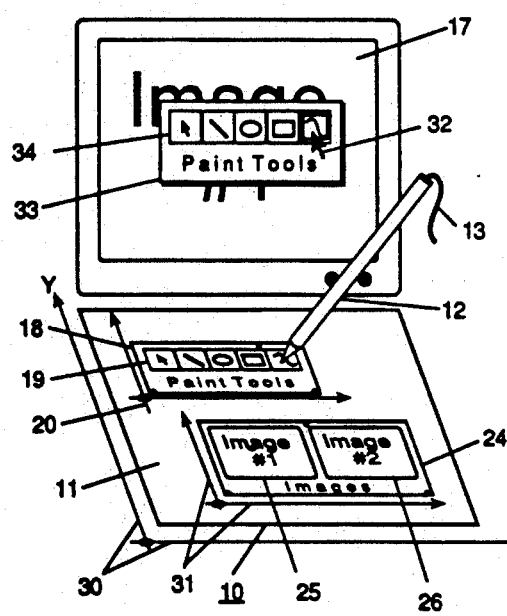

In accordance with the present invention, the computer software is provided with an additional software switch in any manner well known to those skilled in computer programming, such that when the software switch is set, a visual image of the overlay, or a predetermined part thereof, is immediately displayed on the monitor screen superimposed on any previously displayed image. For example, after representative files or images of overlays 18 and 24 have been selected from the computer memory as described above, the physical touching or the positioning of the point of stylus 12 in close proximity to overlay 24 causes a visual and replicated image thereof to be immediately projected onto monitor 17, with the relative coordinate position of the point of stylus 12 with respect thereto being depicted by the position of a visual cursor or arrow 32 on monitor 17 in an exact relative position to the location of the point of stylus 12 on overlay 24. Once overlay 24 is displayed on the monitor screen 17, selection of Image #1 can be carried out using point-and-click selection from overlay 24 as illustrated in FIG. 4(a). Whenever the point of stylus 12 is subsequently touching or is positioned in close proximity to Paint Tools Overlay 18, an image of Paint Tools overlay 18 is immediately projected onto monitor 17 overlaying Image #1, with the relative position of the point of stylus 12 with respect thereto being in the exact same relative position of cursor 32 on monitor 17 as shown in FIG. 4(b). Once the desired menu is displayed on monitor screen 17, menu item selection can again be carried out using point-and-click selection from the displayed menu. For example, as illustrated in FIG. 4(c), whenever the point of stylus 12 is subsequently depressed on the right-most or annotation tool representation on overlay 18, the annotation icon on the Paint Tools menu 34 displayed on monitor 17 is highlighted to indicate its selection. When the point of stylus 12 is subsequently moved away from Paint Tools overlay 18, the Paint Tools menu on monitor 17 disappears.

Figure 4D:
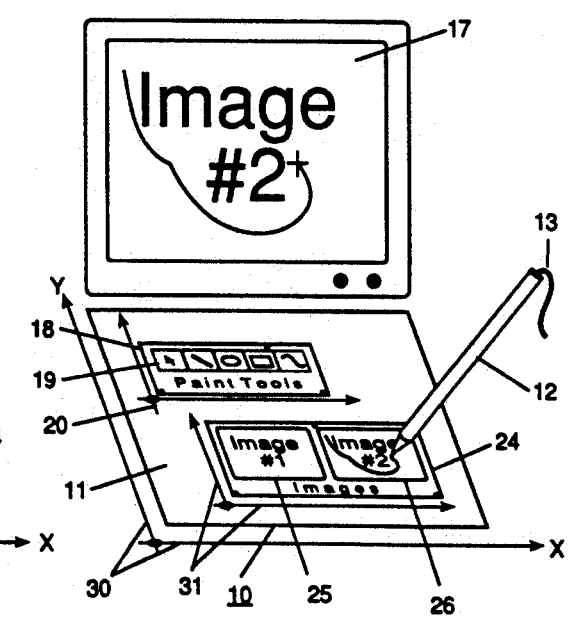

As illustrated in FIGS. 4(c) and 4(d), it is assumed that the operator has first selected Image #2 by depressing the point of stylus 12 on the Image #2 representation on overlay 24 and then has subsequently selected the annotation tool by depressing the point of stylus 12 on the annotation tool representation on overlay 18. Thereafter, the annotation tool is used in a well-known manner by simply dragging the point of stylus 12 on displayed Image #2 and the line thus drawn by the stylus thereon is displayed electronically on monitor 17. However, if the operator instead wishes to cause the computer to effectively draw an ellipse on the displayed Image #2 by selecting the ellipse tool from menu 34, the ellipse tool may likewise be selected from the tablet overlay menu without necessitating the shifting of the operator's vision from the monitor screen to either of overlays 18 and 24. After the ellipse is selected, stylus 12 is either moved to another portion of the overlay image or may be moved to an additional overlay similarly positioned on the digitizer tablet surface 11, such as one containing an X-Y key where the ellipse tool can be used to produce the desired result on monitor screen 17 in a well-known manner. Upon stylus 12 exiting the overlay, the overlay image optionally disappears and the entire screen work area may be exposed, if desired. Stylus 12 is typically moved to another work overlay where the selected tool is used to draw another object on the monitor screen and/or keyboard and/or computer functions can be selected from other overlays already positioned on the digitizer tablet surface or subsequently placed thereon.

Figure 5:
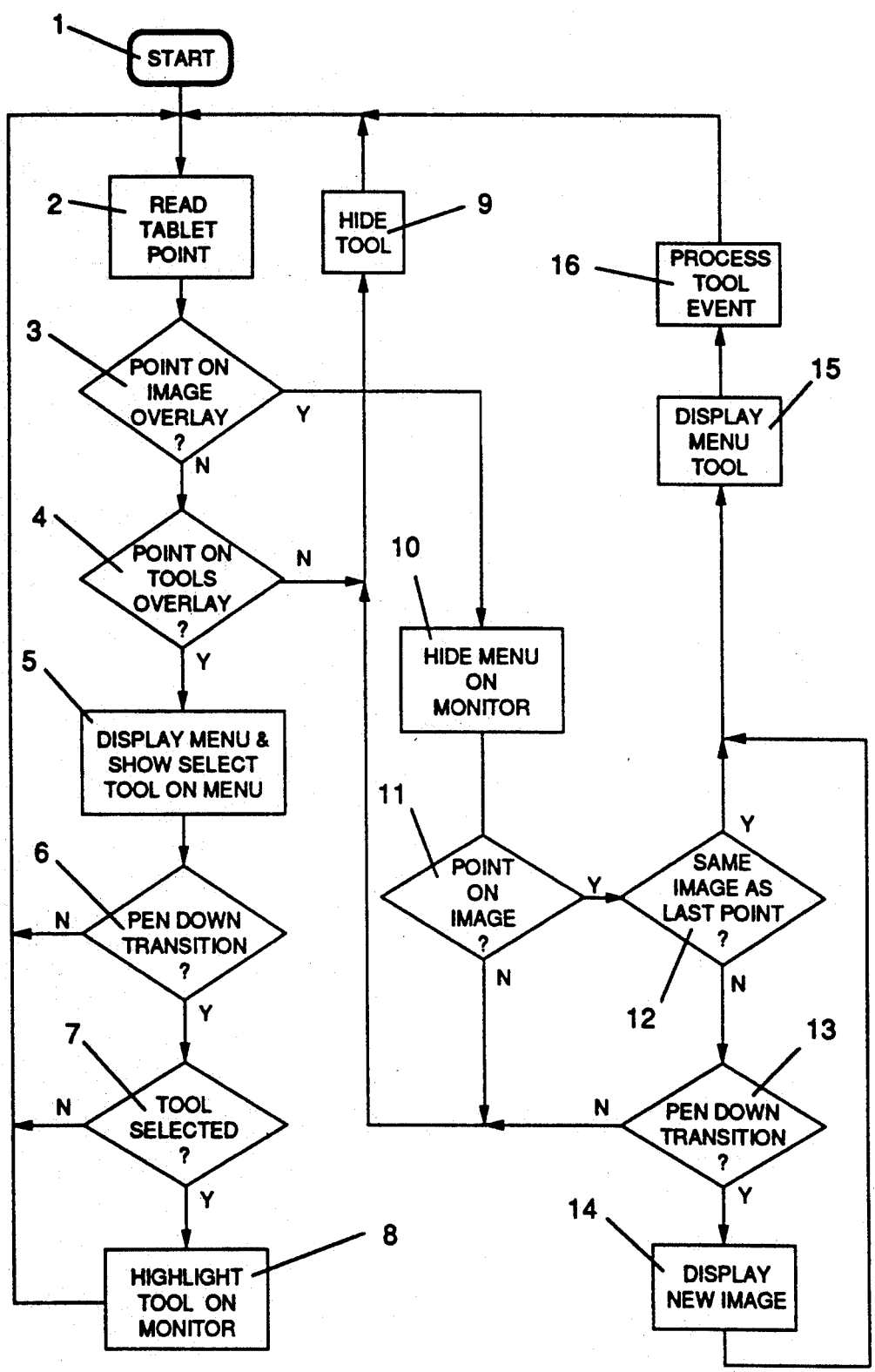

In FIG. 5 of the drawings, there is illustrated a simplified flow diagram comprising a sequence of logical steps numbered 1 through 16 which logically describes in a step-by-step manner the same procedure as previously described.

Step #1: It is assumed that the same two overlays 18 and 24 shown in FIGS. 4(a) through 4(d) have been placed on the activated surface of digitizer tablet 10 and that Paint Tools overlay 18 and Images overlay 24 have been entered into the memory of the computer via digitizer tablet 10 in accordance with the entry procedure described in the said '323 Hoffman patent or according to other alignment and entry procedures used in the computing industry. FIG. 4(a) illustrates this starting state. Thus, it is assumed that Image #1 on overlay 24 is currently being displayed on monitor 17, that stylus 12 is currently positioned over Image overlay 24 and that its corresponding position is being displayed as arrow 32 on Image #1 displayed on the monitor. FIG. 4(a) illustrates this starting state.

Step 2—Read Tablet Point: A single (X,Y) coordinate point is accepted from the digitizer tablet and stored for processing by other software modules.

Step 3—Stylus Point On Image Overlay?: The (X,Y) coordinate point is mathematically transformed to determine if it lies on the tablet area covered by the Images overlay.

YES: If the answer is YES, then the point is processed according to Step 10 below.

NO: If the answer is NO, then the point is further processed to determine if it lies on another overlay according to Step 4 below.

Step 4—Point On Paint Tools Overlay?: The (X,Y) coordinate point is mathematically transformed to determine if it lies on the tablet area covered by the Paint Tools overlay.

YES: If the answer is YES, processing proceeds according to Step 5 below.

NO: If the answer is NO, processing proceeds according to Step 9 below.

Step 5—Display Paint Tools Menu And Show Selected Tool on Menu: As soon as it is determined that the stylus is over the Paint Tools overlay, the Paint Tools menu is displayed on the monitor, superimposed on top of all other information displayed on the monitor. This is illustrated in FIG. 4(b). Note that the arrow tool is shown highlighted in FIG. 4(b) to visually indicate that it is the currently selected tool.

The position of the Paint Tools menu on the monitor can either be centered or be positioned according to the user's preference using a drag bar interface common in the computer industry.

Note that the user can look either at the monitor or at the overlay to determine stylus position on the Paint Tools overlay or menu. The arrow select tool is displayed on the Paint Tools menu in the exact relative position as the stylus is positioned on the Paint Tools overlay.

Step 6—Stylus Down Transition?: A transition from Stylus up to Stylus down is used to indicate tool selection.

YES: If the answer is YES, the tablet (X,Y) point is further examined to determine if a Tool has been selected according to Step 7.

NO: If the answer is NO, another (X,Y) point is read from the tablet according to Step 2.

Step 7—New Tool Selected?: If a tool different from the current one is not selected, the current tool highlighting remains.

YES: If the answer is YES, the point is processed according to Step 8.

NO: If the answer is NO, another (X,Y) point is read from the tablet according to Step 2.

Step 8—Highlight Tool On Monitor: A pen down transition on a new tool results in the new tool being selected and highlighted on the monitor. In the illustration being described, the annotation tool is selected as shown in FIG. 4(c). Depressing the stylus on the annotation tool causes the annotation tool on the monitor to be highlighted.

After the new tool is selected, a new (X,Y) point is read from the tablet according to Step 2.

As long as the stylus remains over the Tools menu, the flow diagram loop described above in Steps 1-8 is repeated over and over again. When the stylus leaves the Paint Tools overlay in Step 4 above, processing proceeds as follows:

Step 9—Hide Tools: Because the stylus is neither over the Paint Tools overlay or the Images Overlay, there is no need to display the tools on the monitor. Another (X,Y) point is read from the tablet according to Step 2 and processing continues.

When a tablet (X,Y) point is sensed over the Images overlay in Step 3, processing proceeds according to Step 10 below:

Step 10—Hide Menu On Monitor: At this point, a tool has been selected for use on one of the images illustrated in FIGS. 2 and 3. The Paint Tools menu on the monitor is hidden and processing proceeds according to Step 11.

Step 1—Point On Image?: As long as the stylus in not over an overlay image, the Paint Tool is not displayed on the monitor.

YES: If the answer is YES, then further examine the tablet point according to Step 12.

NO: If the answer is NO, then hide the Paint Tool on the monitor and proceed according to Step 9.

Step 12—Same Image As Last Point?: As long as tablet points are on the same image as the previous point, processing continues using the existing image.

YES: If the answer is YES, keep displaying the current image and proceed according to Step 15.

NO: If the answer is NO, then further examine the tablet point according to Step 13.

Step 13—Stylus Down Transition?: A new image is displayed only if a stylus down transition is sensed on an overlay image which is different from the image currently displayed on the monitor.

YES: If the answer is YES, then proceed according to Step 14.

NO: If the answer is NO, then hide the Paint Tool on the monitor and proceed according to Step 9.

Step 14—Display New Image: The stylus down transition on a new image causes the new image to replace the existing image on the monitor. This transition is illustrated in FIG. 4(d).

Step 15—Display Paint Tool On Monitor: The Paint Tool selected in Step 7 is displayed in the same relative position on the monitor image as the stylus is located on the overlay image. In the example illustrated in 3(d), the "+" annotation tool is displayed.

Step 16—Process Tool Event: In the foregoing example with the annotation Paint Tool selected, each subsequent point results in a line segment being drawn to it on the monitor from the immediately preceding point. This results in a continuous line being drawn on the monitor representative of the line drawn on the overlay image. This is illustrated in FIG. 3(d).

Other Paint Tool events cause the select arrow to be displayed as a straight line or lines, or as ovals or rectangles, or the like, to be drawn on the current image.

Many variations may be made to the logic presented without departing from either the spirit or scope of the present invention. For example, some users may prefer to display a new image when the stylus first enters the new image area on the overlay, instead of waiting for first stylus down. Additionally, the Paint Tools overlay and the Images overlay may be combined on a single overlay and transitions to the individual tools or images may be used instead of overlay boundaries as set forth in Steps 3 and 4 above.

Having illustrated and described in detail each of the salient features, functions and advantages of the present invention in its preferred embodiment utilizing a triad of control points printed on the surface of the overlay, it will be readily apparent from the detailed specifications to those skilled in the art that the present invention will likewise find substantial utility to those prior art systems previously described which do not utilize any control points printed on the surface of the overlay but, for proper operation, require that the X-Y coordinate axes of the overlay be precisely arranged to coincide with the X-Y axes of the rectangular digitizer tablet. By the use of control points printed on the overlay surface, the overlay may be physically reduced in size to save space on the digitizer tablet. Additionally, if pop-up menus are used, overlays which are visually to small for normal viewing can be successfully used because menu item selection is done with the point-and-click selection from a readily viewable image thereof displayed on the monitor screen.

Many other obvious modifications and additions may be made thereto without departing from the true spirit and scope of the present invention and it is intended by the appended claims to cover all such features, functions and advantages as disclosed and any obvious modifications and additions thereto and not to limit the invention to the exact construction and operation illustrated and described in the preferred embodiment. For example, while the preferred embodiment provides for near instantaneous display and disappearance of the overlay images, one or more software switches may be used to selectively cause certain overlays to pop-up, or all of them to pop-up, or it may be desired to actually prevent certain of the overlays from popping-up. To facilitate the desired rapid response, the displayed image may contain less detail than the printed image on the digitizer tablet. While very large overlays may not properly display on the monitor screen of some types of computers, or the particular computer may operate too slowly when large images are displayed on the monitor screen, it is possible to display sub-images of larger overlays. As the stylus moves across a large overlay, a smaller window may be displayed in a region of the stylus tip. In instances where pop-up menus are too slow, menus may optionally be displayed upon first stylus-down instead of upon stylus entry of the overlay. Such selection may likewise be controlled by means of a software switch in accordance with the teachings of the present invention. Use of first stylus-down would prevent distracting flashing of menus when the stylus passes over unwanted overlays. Upon the operator becoming accustomed to the positions of high use overlays on the tablet, it will no longer be necessary for the operator to shift vision from the computer screen to the tablet. Such positioning, of course, will not only depend upon individual operator preferences, but will likewise depend upon the overlay layout.

As a further refinement of the present invention, the artwork on the printed overlay may be replaced entirely with a single, highly visible word or icon representing a preselected group of menu items. For example, the word "TOOLS" could replace all of the icons on the overlay, as long as actual menu selection is done by using the image on the monitor screen, rather than by using the overlay itself. Alternatively, the "TOOLS" label could also be displayed on the monitor screen while the stylus is used to search for the desired overlay without looking at the tablet. Upon first stylus-down on the desired overlay, a detailed image of the overlay may be displayed on the monitor screen for normal menu selection. Displaying overlay labels instead of displaying the entire overlay image enables faster paging and less visual activity while progressing through the selection process.

There are at least three important reasons for the displayed monitor image to be made to be dissimilar to the corresponding overlay artwork: (1) the overlay artwork may be too small to be easily readable, in which case the monitor image is used to provide details for menu selection, and, a larger number of smaller overlays may be placed on the tablet and which may be miniatures of the monitor image, or they may be simply labeled with their primary function (e.g. PAINT TOOLS); (2). the key/button areas are defined on the overlay but do not appear on the monitor screen, which may be desirable when controlling Hypercard stacks as supplied by Claris Division of Apple Computer, Inc., whereby buttons can be freely defined on the cards in a conventional manner without any great concern as to their visual appearance. In this instance, the Hypercard stack is printed with buttons showing, in miniature or "thumbnail" format, and with a triad of control points printed thereon and, upon sequential entering of the triad of control points, the stack is loaded in the computer memory. Thereafter, when a particular card miniature printed on the overlay is touched with the stylus, that particular card image is displayed on the monitor screen. Additionally, keys/buttons on the monitor image may optionally be made invisible in order to present the best visual image to an audience and, because the keys/buttons are visible on the overlay, they can be operated from the digitizer tablet itself, instead of being operated in a conventional Hypercard manner using a display. In this instance, the presenter using a digitizer tablet and overlays can function successfully without direct view of a monitor screen as represented in FIG. 4 of the drawings; and, (3) overlay artwork may be represented by multiple images as shown in FIG. 4 whenever this is desirable for presentation control.

Having so described and illustrated the principles of my invention in a preferred embodiment, it is intended, therefore, in the annexed claims, to cover all such changes and modifications as may fall within the scope and spirit of the following claims:

We claim:

1. The combination comprising: a computer; a computer controlled display and cursor generating means; digitizing means operatively coupled to said computer operatively connected with said display means and having a surface which includes a plurality of coordinately arranged active locations thereon and a manually operable pointing means for providing an output signal which is representative of each of said locations, as determined by the contiguous positioning of said pointing means with respect thereto; storage means operable by said computer for storing information therein which is representative of an overlay positioned on said digitizer surface means coupled to said storage means and to said digitizing means and responsive to a predetermined output signal from said digitizing means for initiating the display on said display means of a representation of said overlay; and means operable whenever said pointing means is at a predetermined position with respect to said positioned overlay for initiating the generation of said predetermined output signal to effect the display by said display means of an image representative of said positioned overlay and including means for controlling said cursor generating means whereby a cursor is simultaneously displayed on said display in substantially the same relative position with respect to the displayed image as the position of said pointing means is with respect to said positioned overlay.

2. Apparatus in accordance with claim 1 wherein said overlay includes at least one predetermined location visibly disposed thereon which is manually selectable by said pointing means to initiate a predetermined function, and wherein said last mentioned means initiates said predetermined function whenever the said pointing means subsequently touches said location.

3. Apparatus in accordance with claim 1 wherein said overlay includes a plurality of individually selectable locations visibly disposed thereon which are each manually selectable by said pointing means to initiate a predetermined function, and wherein said last mentioned means initiates each such predetermined function whenever the said pointing means subsequently touches a corresponding location.

4. Apparatus in accordance with claim 1 wherein said overlay includes at least one selectable location thereon which, when selected, initiates a predetermined function, and wherein said last mentioned means initiates said predetermined function whenever said location is selected by said pointing means.

5. Apparatus in accordance with claim 1 wherein said overlay includes a plurality of individually selectable locations thereon each of which, when selected, initiates a predetermined function, and wherein said last mentioned means initiates each of such predetermined functions whenever a corresponding one of said predetermined locations is selected by said pointing means.

6. Apparatus in accordance with claim 5 wherein said plurality of individually selectable locations comprise a selectable menu of computer commands.

7. Apparatus in accordance with claim 1 wherein said last mentioned means includes software switching means actuable whenever said pointing means is at a predetermined position with respect to the positioned overlay.

8. Apparatus in accordance with either of claims 1 through 7 wherein each of said overlays is randomly positioned on the active surface of said digitizing means and further includes a unique triad of control points thereon which are selectable by said pointing means to initiate storage in said storage means of signals representative of each overlay and at memory locations determined by the corresponding triad of control points on each overlay.

9. The combination comprising: a computer; a computer controlled display and cursor generating means operatively coupled to said computer; digitizing means operatively connected with said display means and having a rectangular coordinately arranged active surface and a manually operable pointing means for providing a coordinate output signal which is representative of the particular set of rectangular coordinates of each of a plurality of predetermined locations on said digitizer surface, as determined by the contiguous positioning of said pointing means with respect to each active location on said digitizer surface; a plurality of individually selectable overlays randomly placed on said digitizer surface, each of said overlays having printed thereon a unique triad of control points individually selectable by said pointing means to provide first predetermined signals from said digitizing means individually representative of each of said triad of control points, and having further printed thereon a plurality of individually selectable locations collectively comprising a selectable menu of predetermined computer commands and individually selectable to initiate a different one of said commands; storage means operable by said computer in response to said first predetermined output signals from said digitizing means for storing information therein representative of each of said positioned overlays and at memory locations determined by the corresponding triad of control points on each of said overlays, and further responsive to second predetermined output signals from said digitizing means for selectively initiating the display by said display means of an image representative of each corresponding overlay; software switching means responsive to the contact of said pointing means with a selected overlay for initiating the generation of said second predetermined output signals and for controlling said cursor generating means whereby a cursor is simultaneously displayed on said display in substantially the same relative position with respect to the displayed image as the position of said pointing means is with respect to said positioned overlay; and means for initiating the particular computer command selected by said pointing means upon contact thereof with the corresponding selectable location on each selected overlay.

* * * * *